United States Patent [19]
Hazenbroek

[11] Patent Number: 5,188,560
[45] Date of Patent: Feb. 23, 1993

[54] WING TIP CUTTER

[76] Inventor: Jacobus E. Hazenbroek, Burg de Zeeuwstraat 52, Numansdorp, Netherlands

[21] Appl. No.: 823,719

[22] Filed: Jan. 22, 1992

[51] Int. Cl.$^5$ ............................................. A22C 21/00
[52] U.S. Cl. ...................................... 452/169; 452/167
[58] Field of Search ........................ 452/164, 166, 167

[56] References Cited

U.S. PATENT DOCUMENTS

| | | | |
|---|---|---|---|
| 4,016,624 | 4/1977 | Martin et al. | 452/169 |
| 4,207,653 | 6/1980 | Gasbarro | 452/169 |
| 4,577,368 | 3/1986 | Hazenbroek | 452/169 |
| 4,597,136 | 7/1986 | Hazenbroek | 452/169 |
| 4,769,872 | 9/1988 | Hazenbroek et al. | 452/169 |
| 4,935,990 | 6/1990 | Cinnenbank | 452/169 |

FOREIGN PATENT DOCUMENTS 8400162 8/1985 Netherlands ........................ 452/169

*Primary Examiner*—Willis Little
*Attorney, Agent, or Firm*—Hopkins & Thomas

[57] ABSTRACT

Birds are conveyed in an inverted attitude suspended by their legs form shackles as their torsos move between a pair of guide rods (48) and guide rails (58) prior to reaching a pair of rotary cutting blades (41). A ramp (62) is positioned to engage the shoulder portions of the birds and a second pair of guide rods (66) engage the mid-wing sections of the birds. The wind tip joints move toward and through adjacently placed rotary cutting blades (41) and rotary discs (44) wherein the wing tip segments are severed from the mid-wing sections.

19 Claims, 3 Drawing Sheets

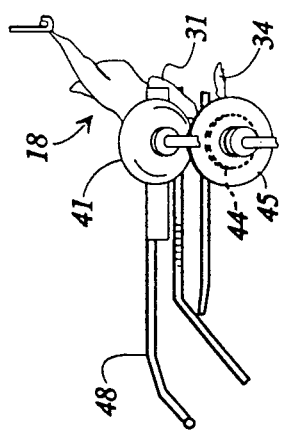
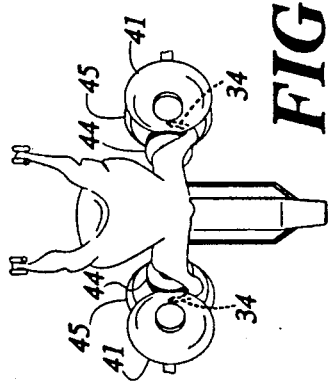
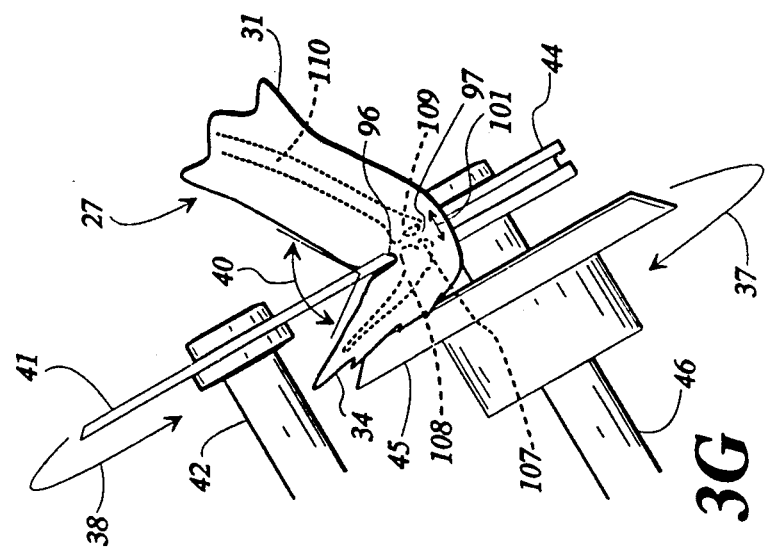
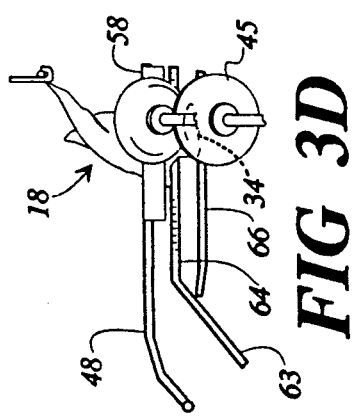
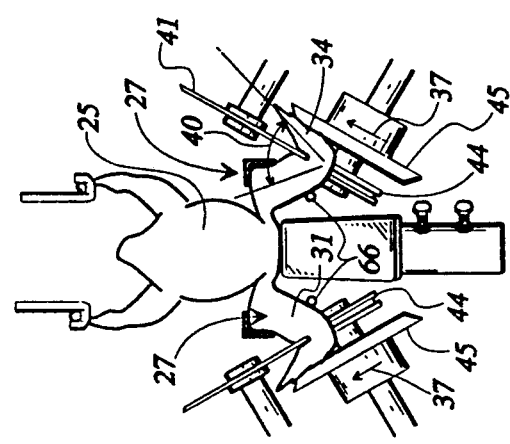

1

WING TIP CUTTER

FIELD OF THE INVENTION

The present invention relates to a method and apparatus for processing previously eviscerated poultry bird carcasses, and, more particularly, to a method and apparatus for severing the wing-tips from the mid portions of the wings of the birds with the wings attached to the carcasses.

BACKGROUND OF THE INVENTION

The processing of poultry carcasses to remove the wings or the wing tips largely has been a manual operation wherein poultry workers cut the wings from the body or torso of a poultry bird carcass, and, thereafter, either the whole wing has been packaged for sale, or the wings have been further cut at their joints to produce drumette, mid-wing, and wing-tip portions for separate packaging and sale. More recently, advances have been made in the automation of poultry wing processing in an attempt by the poultry industry to keep up with the growing consumer demand for poultry wings, especially chicken wings, as evidenced by the rise in the demand for individual hot and spicy chicken wings.

Not only has the production of poultry wings been facilitated through automated processes, but manufacturing costs have been reduced, while the risk of personal injury to the poultry cutters has been reduced. However, for optimization of a poultry processing operation, it is desirable to perform as many of the processing operations as possible, including the poultry wing processing operations, while the poultry birds are suspended by their legs, for example, from a moving overhead conveyor system. This arrangement eliminates the necessity of removing the poultry bird carcasses from the conveyor and remounting them onto a separate machine for the removal of the wings, an operation that is time consuming and labor intensive.

Heretofore, the various automated methods and apparatus that have been developed for cutting poultry wings into individual parts usually have involved separate machines removed from the overhead conveyor line. In U.S. Pat. No. 4,016,624 to Martin et al, a poultry processing machine is disclosed that includes a wing cutting section for severing the wing tips, mid-wings, and drumettes sequentially from the body of a poultry carcass. A previously eviscerated poultry carcass is mounted manually onto a mandrel and moved through a series of wing portion severing stations wherein, among other operations, the wing tip is severed from the mid-wing. With this machine, an operator is required to mount the carcasses, which apparently was previously removed from a conveyor line of an evisceration process, onto the mandrels which is a processing step that delays the progress of the carcasses, lengthens the processing time, and increases the labor costs.

U.S. Pat. No. 4,207,653 to Gasbarro and U.S. Pat. No. 4,577,368 to Hazenbroek both disclose poultry wing processing methods whereby previously cut whole wings are placed onto a rotary wing carrier wheel and cut into wing tip, mid-wing, and drumette sections. These machines require an additional operator to place the wing portions, previously severed from the poultry carcasses, onto the rotary wing carrier wheel.

In U.S. Pat. No. 4,769,872 of Hazenbroek a poultry carcass processing apparatus is disclosed for cutting the poultry wings from the poultry carcass and subsequently cutting the joints between the wing tip, mid-wing, and drumette portions. While the apparatus of this patent performs a number of cutting functions, it still requires an operator to remove the carcass form the conveyor and mount it onto the cutting apparatus.

The manual method of cutting poultry wings has many disadvantages, but it does have the advantage that the cuts between the wing joints can be made accurately. Prior art machines for cutting wings have limited capability to accommodate and adjust for poultry wings of varying sizes, which can cause poultry wing sections to be improperly cut and bone fragments to be lodged in the meat of the wings, an extremely undesirable result. U.S. Pat. No. 4,577,368, also to Hazenbroek, discloses a poultry wing processing machine designed to accommodate poultry wings of varying sizes. However, the machine of this patent is a machine remote from the main conveyor line, which, as previously stated, requires an additional operator to load the poultry wings onto the machine.

Thus, a need exists in the art for a method and apparatus for accurately severing the wing tips from the mid-wing sections of the wings of poultry carcasses as the carcasses are being conveyed by an overhead conveyor system.

SUMMARY OF THE INVENTION

Briefly described, the present invention comprises a poultry wing processing apparatus for operation in an automated poultry processing line wherein the wing tip segments of poultry carcasses are severed from the mid-wing segments, while the carcasses are moved in series through the apparatus suspended in an inverted attitude from an overhead conveyor. The apparatus operates simultaneously on both wings of each previously eviscerated carcass as the suspended carcasses are conveyed forwardly through the apparatus with the carcass breast portions facing in the direction of movement.

The wing tip cutter apparatus includes two cutting assemblies, each positioned along the processing path on an opposite side thereof to operate on a wing of a carcass as the carcass moves between the cutting assemblies. Each cutting assembly includes a rotary disc cutter positioned parallel to, and spaced from, the path of movement of the carcasses. Positioned adjacent each rotary disc cutter is a peripherally slotted wing tip joint guide disc. The peripheral cutting edge of each rotary disc cutter moves through the peripheral slot or groove of each slotted guide disc as the cutting discs rotate in the opposite direction of the slotted guide discs. As a carcass moves through the wing tip cutter apparatus, the wing tip joint between the mid-wing segment and the wing tip segment of each wing engages either the periphery of the slotted guide disc and is guided thereby toward the intersection of the rotary disc cutter and the slotted guide disc wherein the wing tip joint is severed, thus separating the wing tip segments from the mid-wing segments.

A wing tip rotary brush disc is positioned adjacent each slotted guide disc for engaging a wing tip segment prior to the wing tip joint reaching the intersection of the rotary disc cutter and the slotted guide disc and brushing the wing tip segment toward the rotary disc cutter. This prevents the wing tip segments from unfolding about the rotary disc cutters as the wing tip joint is severed.

The apparatus includes guide means for guiding each wing tip joint of a poultry carcass wing toward the intersection of the rotary disc cutter and the slotted guide disc and for guiding the wing tip of each poultry carcass wing toward the wing tip rotary brush disc. The guide means comprises two laterally spaced stationary upper guide rods mounted on opposite sides of, and parallel to, the path of movement of the suspended carcasses. These guide rods are positioned to engage the torsos of the carcasses and reduce any lateral swaying movement. The guide means also includes a shoulder engaging ramp, which is mounted below the path of movement of the carcasses and is positioned to engage the shoulder portions thereof and tilt the torsos of the carcasses rearwardly away from the direction of movement, thus raising the shoulder portions and the wings for vertically positioning the wing tip joints at a predetermined height for cutting. A pair of mid-wing engaging guide rods are mounted adjacent the shoulder engaging ramp and are spaced laterally outwardly from and parallel to the ramp. This pair of guide rods acts to push the mid-wing sections laterally outwardly away from the torsos, thereby extending the wings from the torsos, which laterally aligns the wing tip joints prior to cutting. Wing guide means mounted adjacent the upper guide rods are positioned to engage the wings and pivot them rearwardly, which rotates the wing tip joints toward the pair of rotary disc cutters.

The apparatus also includes means for adjusting the positions of the shoulder engaging bottom ramp, the upper guide rods, the lower guide rods, and the wing engaging means with respect to the rotary disc cutters. This enables the apparatus to accommodate bird carcasses of varying sizes.

Therefore, it is an object of the present invention to remove expediently and reliably the wing tip segments from the mid-wing segments of poultry wings in an automated poultry processor as the poultry carcasses are conveyed in series, suspended by their legs, along an overhead conveyor system.

It is another object of the present invention to accommodate poultry carcasses having poultry wings of varying sizes in an automated poultry wing processor.

Another object of the present invention is to automate fully the separation of the wing tip segments from the mid-wing segments of poultry wings, thus reducing operator handling of the carcasses during automated poultry processing.

Yet another object of the present invention is to provide a means for cutting wing tip segments at their joints that is relatively simple in design, inexpensive to produce, easy to install, efficient to operate, and which reliably functions to remove the wing tip segments from the mid-wing portions of poultry wings.

Still another object of the present invention is to increase the poultry carcass processing speed compared to prior art machines.

Other objects, features, and advantages of the present invention will become apparent from the following specification, when read in conjunction with the accompanying drawings.

BRIEF DESCRIPTION OF THE DRAWINGS

FIGS. 3A–3D, 3H and 3I are schematic side views of the bird as it moves through the cutter apparatus;

FIGS. 3E and 3F are a schematic front view and a schematic plan view, respectively, of the cutter apparatus just prior to the wing tip joints engaging the rotary disc cutters; and FIG. 3G is a view of the mid-wing section and the wing tip of a poultry wing as the rotary disc cutter of FIG. 2 engages the wing tip joint.

DETAILED DESCRIPTION

Figure 1:
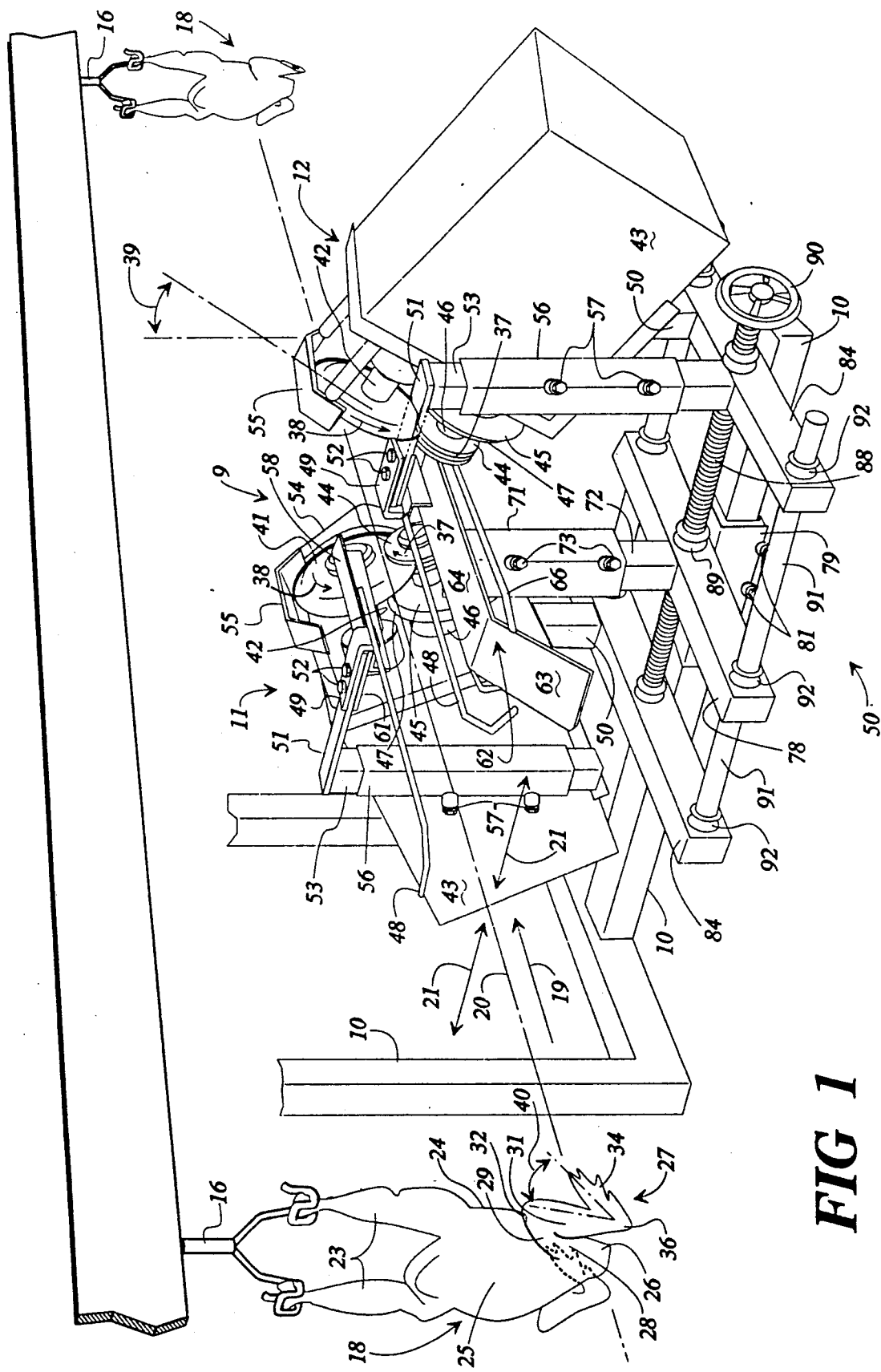
FIG. 1 is a perspective view of the apparatus of the present invention shown positioned beneath an overhead conveyor system.

Referring now to the drawings, in which like numerals represent like parts throughout the several views, FIG. 1 illustrates a wing tip cutter apparatus 9 that embodies principles and features of the present invention. The apparatus 9 includes a frame 10, which supports two wing tip cutting assemblies, indicated generally at 11 and 12, positioned beneath an overhead conveyor 14 from which a plurality of regularly spaced shackles 16 depend. Throughout the ensuing description, reference will be made to rearwardly and forwardly directions, based upon the direction of movement of the bird carcasses 18 through the apparatus 9, as indicated by the arrow 19, to the processing path along which the carcasses 18 are conveyed, as indicated by the dotted line 20, and to inwardly and outwardly directions, based upon movements and positions of the poultry wings toward and away from the processing path 20 as indicated by arrows 21. In addition, reference will be made to the various parts of the bird carcasses, specifically, the legs 23, the breast portions 24, the torso 25, the shoulder portion 26, the wings 27, which include a drumette 29, a mid-wing segment 31, a joint 32 between the drumette 29 and mid-wing segment 31, which shall be referred to as the elbow joint, a wing-tip 34, and a joint 36 between the mid-wing section 31 and the wing tip 34, which shall be referred to as the wing tip joint, and the shoulder joints 28 between each wing 27 and the carcass 18.

The apparatus 9 is positioned along a processing line beneath a conventional overhead conveyor 14 at a point along the line reached by the conveyed carcasses 18 after the birds have been killed, defeathered, and eviscerated. The apparatus is designed to sever the wing tip segments 34 from the mid-wing segments 31 as the bird carcasses 18 are suspended in an inverted attitude by their legs 23 from the shackles 16, with their breast portions 24 facing forwardly in the direction of movement 19.

Figure 2:
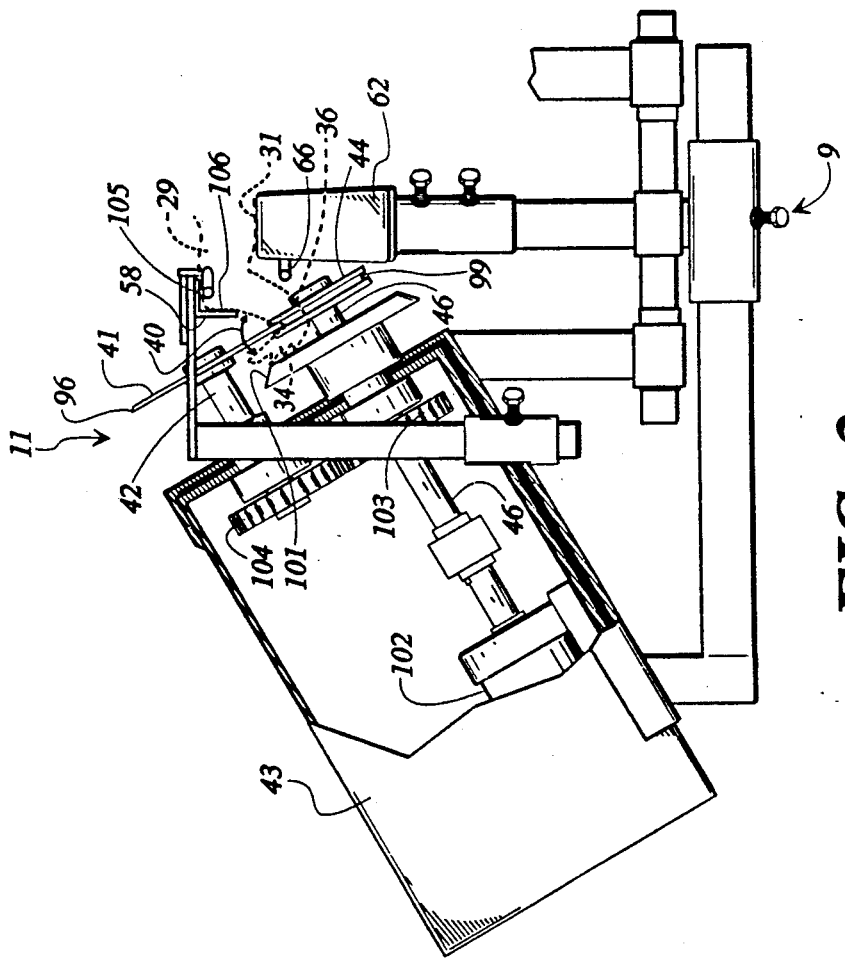
FIG. 2 is a front elevational view of one half of the apparatus of the invention shown partially in section with portions of the housing cut away to show the drive means and associated gears within the cutting assembly.

The wing tip cutting assemblies 11 and 12 are positioned along the processing path 20 on opposite sides thereof and are adapted to cut simultaneously the wing tip segments 34 from the wings 27 as the carcasses 18 are conveyed through the apparatus 9. Assemblies 11 and 12, which are essentially mirror images of each other, each comprises a disc cutter 41 mounted on a blade drive shaft 42, which is coupled to a drive means (not shown) within a motor enclosure housing 43. A peripherally slotted rotary guide disc 44 is mounted below and adjacent to the rotary disc cutter 41 on a disc drive shaft 46, which is also coupled to the drive means within housing 43. Certain of the internal components of the housing 43, including the drive means, are shown in FIG. 2 and are discussed hereinafter. The slotted rotary guide disc 44 and the rotary disc cutter 41 of each cutting assembly 11 and 12 are adapted to rotate in the same plane, but in opposite directions, discs 44 in the direction of arrows 37 and discs cutter 41 in the direction of arrows 38, with the peripheral edges of the disc cutters 41 and the slotted guide discs 44 intersecting each other, as more fully discussed with reference to FIG. 2. This counter-rotating movement causes the wing tip joints 36 to be drawn into severing contact with the rotary disc cutters 41 of each cutting assembly 11 and 12 as the carcasses 18 move through the apparatus 9 along the processing path 20.

A wing tip rotary brush disc 45 is mounted on each of the disc drive shafts 46 of the cutting assemblies 11 and 12 spaced outwardly from the slotted guide discs 44. Each wing tip rotary brush disc has an angled peripheral edge 47, which forcibly brushes the wing tip segments 34 toward the rotary disc cutters 41 prior to and as the wing tip joints 36 are severed by the rotary disc cutters 41. This action assists in keeping the wing tip joint angles 40 between the mid-wing segments 31 and the wing tip segments 34 aligned with the rotary disc cutters 41 as the cutters 41 sever the wing tip segments 34. The drive shafts 42 and 46 of the wing tip cutter assemblies 11 and 12 are mounted parallel to each other and perpendicular to the processing path 20, and they are positioned at an angle with respect to the general vertical attitude of the carcasses 18 so that the angle 39 between the plane of the alignment of the rotary disc cutters 41 and slotted guide discs 44 and the vertical plane is approximately 30 degrees, which positions the rotary disc cutters 41 so that the wing tip joint angles 40 are properly aligned with the disc cutters 41 for making clean, high speed cuts through the wing tip joints 36.

The wing tip cutting assemblies 11 and 12 also comprise a pair of deflection plates 54 (only one of which is shown) mounted to housings 43 for deflecting the wing tip segments 34 downward after they have been severed. Blade guards 55, mounted to housings 43, serve to prevent any carcass portions or debris from deflecting upward. The wing tip cutting assemblies 11 and 12 are mounted on support beams 50, which are mounted on an adjustment means, indicated generally at 50 and discussed hereinafter.

A pair of torso aligning upper guide rods 48, 48 are mounted, along opposite sides of the processing path 20, to support bars 49, 49 which secure the guide rods 48, 48 in a position parallel to the processing path 20, each rod 48, 48 spaced an equidistance therefrom. The guide rods 48, 48 converge towards the processing path 20 for the initial or upstream portion of their length in order to gather the carcasses 18 toward the cutting apparatus 9 and align them with the processing path 20. Support bars 49, 49 are removably mounted to support plates 51, 51 as by bolts 52, 52. Each support plate 51 is welded at its end opposite guide rod 48 to a vertical support beam 53, which is slidable within a hollow vertical sleeve member 56 and secured thereto by set screws 57. Sleeve members 56, 56 in turn, are welded to the sides of the housings 43, 43. With the torso engaging guide rods 48, 48 removably secured to support plates 51, 51 the guide rods 48, 48 may be removed form the apparatus 9 for cleaning purposes. Thus, it can be seen that guide rods 48, 48 function as a means for aligning the carcasses with the processing path.

A wing engaging L-shaped guide rail 58 is mounted adjacent each upper guide rod 48 and parallel thereto and just above the lower peripheral edges of each rotary disc cutter 41. As the carcasses are conveyed through the cutter apparatus 9, the L-shaped guide rails 58, 58 engage the wings 27 from above the drumettes 29 and from the outward sides of the mid-wing segments 31, as more fully discussed with reference to FIG. 2, causing the wings 27 to rotate or pivot rearwardly. This rearward movement of the wings 27 causes the angles 40, 40 between the mid-wing segments 31 and the wing tip segments 34 to rotate forwardly around aligned in the direction of movement 19 so that the angles 40, 40 are aligned facing the rotary disc cutters 41, 41. Thus, it can be seen that L-shaped guide rails 58, 58 function as a means for pivoting the wings rearwardly away from the direction of movement of the carcasses.

The L-shaped guide rails 58, 58 are welded to support bars 61, which are removably mounted to support plates 51, 51. Thus, guide rails 58, 58 may also be removed for cleaning purposes. The set screws 57, 57 on sleeve members 56, 56 provide a means for adjusting the position of the guide bars 48, 48 and guide rails 58, 58 with respect to the rotary disc cutters 41, 41 thus allowing the apparatus 9 to be easily set up to process carcasses having mid-wing segments of varying sizes.

A shoulder portion engagement ramp 62 is mounted beneath the processing path 20 parallel thereto and includes and inclined surface 63 and a horizontal surface 64. The inclined surface 63 is positioned to engage the should portion 26 of the carcasses 18 as the birds are conveyed through the apparatus 9, causing the carcasses 18 to tilt rearwardly away from their direction of movement 19, which rises the shoulder joints 28, 28 between the wings 27, 27 and the carcass of the carcasses 18 as the shoulder portion 26 slides up the inclined surface 63 to the level of horizontal surface 64, which positions the shoulder joints 28, 28 at substantially a predetermined height with respect to the rotary disc cutters 41, 41. Thus, it can be seen that shoulder portion engagement ramp 62 functions as a means for tilting the bird carcasses to place the joints between the wings and the carcass at substantially a predetermined height. The horizontal surface 64 of the ramp 62 is mounted on top of a sleeve member 71, which is slidable on vertical support beam 72 and secured thereto by set screws 73, 73. These set screws 73, 73 provide a means for adjusting the position of the ramp 62 with respect to the rotary disc cutters 41, 41, thus allowing the apparatus 9 to be easily adjusted to accommodate carcasses of varying sizes. Support beam 72 is mounted at its lower end on the adjustment means 50.

A lower guide rod 66 is positioned adjacent each side of the horizontal surface 64 of ramp 62. Each lower guide rod 66 extends from beneath the inclined surface 63 of ramp 62 outwardly and upwardly for an initial portion of its length and, for the rest of its length, substantially parallel with the horizontal surface 64 of the ramp 62 and past the rotary disc cutter 41. The lower guide rods 66 are mounted to support brackets (not shown), which are mounted to, and extend upwardly from, the underside of housings 43. The purpose of the lower guide rods 66 is to engage the inward sides of the mid-wing segments 31, 31 causing the wings 27, 27 to expand outwardly, which positions each wing tip joint 36 laterally in line with each rotary disc cutter 41. Thus, it can be seen that the lower guide rods 66 function as a means for guiding the mid-wing segments outwardly from the carcass. The upper and lower guide rods 48, 48 and 66, 66, the wing engaging L-shaped guide rails 58, 58, and the shoulder portion engagement ramp 62 function as guide means for directing the wing tip joints toward the intersections of the rotary disc cutters and the slotted guide discs and wing tip segments toward the wing tip rotary brush discs.

The adjustment means 50 functions to adjust the position of the rotary disc cutters 41 with respect to the processing path 20, thus allowing the apparatus 9 to process carcasses 18 having wing spans of varying sizes. Adjustment means 50 comprises an adjustment screw 88, which extends through a main base support bar 78 and two travelling bars 84, 84 and is rotatably supported within a retainer ring 89 by the main base support bar 78. The adjustment screw 88 is adapted to threadably engage the travelling bars 84, 84, with the threads on one side of the main base support bar 78 being reverse threads. A hand wheel 90 is mounted to one end of the adjustment screw 88, the turning of which causes the travelling bars 84, 84 to move towards or away from the main base support bar 78, thus causing the wing tip cutting assemblies 11 and 12 mounted on the travelling bars 84, 84 to move laterally with respect to the processing path 20. Support shafts 91 extend through bushings 92, 92 at the ends of the main base support bar 78 and the travelling bars 84, 84, thereby serving to support the wing tip cutting assemblies 11 and 12 while allowing them to be adjusted towards and away from the processing path 20. The main base support bar 78 is mounted atop a horizontal sleeve member 79 slidably secured to frame 10 by set screws 81, 81.

FIG. 2 illustrates some of the internal components of the housing 43 of wing tip cutting assembly 11 and more clearly details the design of the rotary disc cutter 41, the peripherally slotted guide disc 44, and the wing tip rotary brush disc 45. Cutting assembly 12 has a similar design. The rotary disc cutter 41 has an angled peripheral edge 96 for severing the wing tip joint 36, and the slotted guide disc 44 has a circumferential slot or groove 99 adapted to receive this peripheral edge 96. This intersecting relationship assists in guiding the wing tip joint 36 past the peripheral edge of the rotary disc cutter 41 as the edge cuts through the wing tip joint 36. The wing tip rotary brush 45 is mounted on disc drive shaft 46 and thereby rotates with slotted guide disc 44. The rotary brush disc 45 has a peripheral edge 47 angled toward the rotary disc cutter 41, which serves to brush the wing tip 34 upwardly and forwardly past the rotary disc cutter 41, and, thus restraining the wing tip from unfolding about the rotary disc cutter 41. This action assists in keeping the acute angle 40 between the mid-wing segment 31 and the wing tip 34 aligned facing and straddling the rotary disc cutter 41 as the wing tip 34 is severed.

As shown in FIG. 2, the wing engaging L-shaped guide rail 58 comprises a top drumette engaging rail 105 and a side mid-wing engaging rail 106 oriented perpendicular to the top rail 105. As the carcass is conveyed past L-shaped guide rails 58, the drumette 29 engages the top rail 105, while the mid-wing section 31 engages the side rail 106. This causes the wings to rotate or pivot rearwardly away from the direction of movement of the carcass causing the wing tip 34 to move outwardly, which aligns the angle 40 between the mid-wing segment 31 and the wing tip 34 with the intersection of the rotary disc cutter 41 and the slotted guide disc 44. The lower guide rod 66 extends outwardly from the shoulder engaging ramp 62 and is positioned to engage the mid-wing segment 31 from its inward side as the wing moves toward the rotary disc cutter 41. This causes the wing to expend, which thereby laterally aligns the wing tip joint 36 with the rotary disc cutter.

The construction of the parts discussed heretofore can be of any of a number of materials having suitable strength and durability for the required purposes and which also comply with government food handling regulations. Preferably, all parts are made of stainless steel, except for the following parts: rotary discs 44 and 45 and gears 103 and 104 may be made of nylon material, handwheel 90 may be made of aluminum, adjustment screw 88 and retainer ring 89 may be made of brass, and bushings 92 may be made of bronze.

OPERATION

Figure 3A:
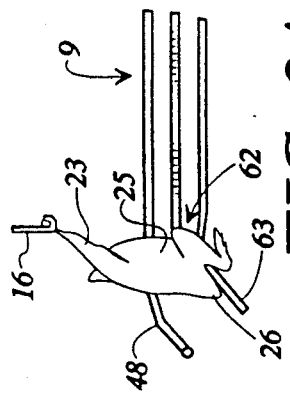
Figure 3B:
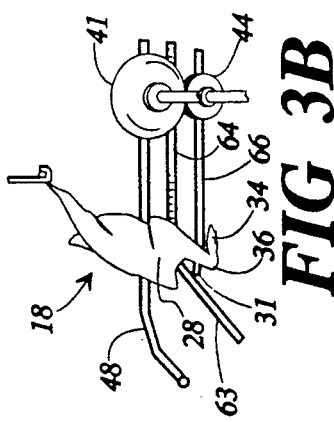
Figure 3C:
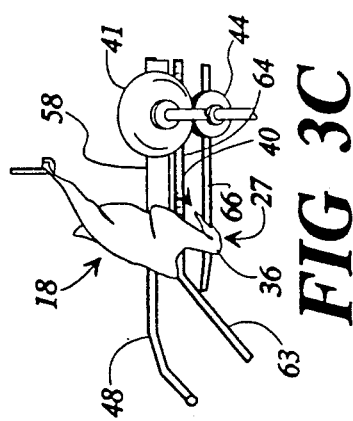

The processing steps, as illustrated in FIGS. 3A–3I, start with a previously eviscerated carcass 18 being conveyed suspended by its legs 23 in an inverted attitude from a shackle 16 towards the cutter apparatus 9, as shown in FIG. 3A. The torso 25 of the carcass 18 engages upper guide rods 48 (only one shown), which gather the carcass 18 toward the apparatus 9 and align it vertically with the processing path. After the carcass 18 is vertically aligned, the shoulder portion 26 engages the inclined surface 63 of ramp 62 as shown in FIG. 3B, which causes the shoulder portion of the carcass 18 to tilt rearwardly, thus raising the shoulder joints 28 to a predetermined height, based on the vertical positioning of shoulder engagement ramp 62, with respect to the rotary disc cutters 41. Just prior to the shoulder portion 26 reaching the top of the inclined surface 63, the insides of the mid-wing segments 31 engage the lower guide rods 66, which extend the mid-wing segments 31, and hence the wing tip joints 36, outwardly from the carcass 18, thereby aligning the wing tip joints 36 laterally with the rotary disc cutters 41. Next, the wings 27 engage the L-shaped guide rails 58, as shown in FIG. 3C, which thereby cause the wings 27 to rotate or pivot rearwardly, thus causing the wing tip joints 36 to rotate forwardly in the direction of movement of the carcasses so that the angles 40 between the mid-wing segments 31 and the wing tip segments more directly face the rotary disc cutters 41 and so that the wing tip segments 34 are positioned to engage the wing tip rotary brush discs 45.

As the carcass 18 is conveyed along and guided by guide rails 58, ramp 62, and lower guide rods 66, the wing tip segments 34 engage the wing tip rotary brush discs 45, as shown in FIG. 3D, which brushes the wing tip segments 34 forwardly and upwardly toward the rotary disc cutters 41. The rotary brush discs 45 continue to brush the wing tip segments 34 as the wing tip joints 36 are severed. This serves to maintain the angle 40 between the mid-wing segments 31 and the wing tip segments 34 thus preventing the wing tip segments 34 from unfolding away from the rotary disc cutters 41 as the wing tip joints 36 are severed.

As shown in FIG. 3E, just prior to the wing tip joints 36 engaging the rotary disc cutters 41, the wings 27 are spread from the carcass and, as shown from above the apparatus 9 in FIG. 3F, the wing tip segments 34 are forced forwardly by the rotary brush discs 45.

As shown in FIG. 3G, as the peripheral edge 96 of one of the rotary disc cutters 41 engages a wing tip joint 36, the cutter's leading peripheral edge 96 causes the connecting tissue 97 between the wing tip joint end 107, wing tip bone 108 and the proximal end 109, mid-wing bone 110 to wrap around the rotary disc cutter 41 as its peripheral edge 96 cuts through the wing tip joint 36. Then, as the wing tip joint 36 is forcibly drawn toward the intersection of disc cutter 41 and the slotted guide disc 44, the trailing end of the wing tip joint 36 tends to stretch, as indicated by arrow 111, thus making it easier for the rotary disc cutter 41 to cut through the connecting tissue 97, rather than the wing tip joint end 107 of the wing tip bone 108 or the proximal end 109 of the mid-wing bone 110, which reduces the potential or bone fragments. After the wing tip joints 36 are severed, as shown in FIGS. 3H and 3I, the wing tip segments 34 fall downwardly into a collection hopper 112, or other suitable collection means.

The apparatus 9 is adaptable to processing many different types of birds, such as chickens, pheasants, geese, ducks and similar fowls and to do so in a relatively quick, efficient manner. The wing tip segments are automatically severed from the mid-wing sections as the carcasses move through a processing line while suspended by their legs from shackles of an overhead conveyor system. Therefore, it can be seen that a method and apparatus are provided that significantly increase the processing rate of poultry carcasses, that also decrease the potential for operator injury, and do not require additional operators.

While the foregoing description and drawings have disclosed a method and apparatus for removing the wing tip segments from the wings of poultry, it will be understood by those skilled in the art that the principles of the invention can be employed in the removal of the distal segments of the limbs of other animals.

I claim:

1. A cutting assembly for a poultry carcass cut-up processing line for removing the wing tip segment from the mid-wing segment of the wings of poultry carcasses comprising:
    a rotary disc cutter having a peripheral cutting edge;
    a peripherally slotted rotary guide disc having its peripheral slot receiving the peripheral cutting edge of said rotary disc cutter so that the cutting edge of said rotary disc cutter intersects the periphery of said slotted guide disc;
    a rotary brush disc coaxial with said slotted guide disc and rotatable in unison with said slotted guide disc; and
    guide means for guiding a joint of the poultry carcass wing toward the intersection of said rotary disc cutter and said slotted guide disc and for guiding the wing tip of the poultry carcass toward said rotary brush disc,
    so that the rotary brush disc brushes the wing tip segment of the poultry wing in a direction generally past the rotary disc cutter and restrains the wing tip segment from unfolding about the rotary disc cutter, and the wing tip joint is guided toward the intersection of the rotary disc cutter and the slotted guide disc where the wing tip segment is severed from the remainder of the poultry wing.

2. The apparatus of claim 1 and further comprising means for tilting each carcass to place the joint between the wings and the carcasses of each bird at substantially a predetermined height, so that the wing tip of each wing can be guided to a predetermined height.

3. The apparatus of claim 1 and further comprising means for guiding the joints between the wing tip segments and the mid-wing sections toward the intersection of the peripheral cutting edge of the rotary disc cutter and the slot of the peripherally slotted rotary guide disc that receives the cutting edge of the disc cutter.

4. A method for removing the wing tip segments of the wings of poultry carcasses comprising:
    advancing a plurality of poultry carcasses in series along a processing line with each carcass suspended invertedly by its legs and with its breasts facing in the direction of movement,
    guiding the joints between the wing tip segments and the mid-wing segments of each wing toward the intersection of the peripheral cutting edge of a rotary-disc cutter and a slot of a peripherally slotted guide disc that receives the peripheral cutting edge of the disc cutter,
    engaging the wing tip joint with one of the peripheries of the slotted guide disc or the rotary disc cutter so that the wing tip joint moves in a path adjacent the peripheral cutting edge of the rotary disc cutter, and
    as the joint moves into the intersection, cutting through the wing tip joint with the cutting edge of the rotary disc cutter.

5. The method of claim 4 and prior to the step of cutting through the joints tilting each carcass to place the joints between the wings and the carcass at substantially a predetermined height so that the wing tip of each wing can be guided to a predetermined height.

6. The method of claim 4 and prior to the step of cutting through the joint, brushing the wing tip segment with a rotary brush disc in a direction generally past the rotary disc cutter and simultaneously restraining the wing tip segment from unfolding about the rotary disc cutter.

7. An apparatus for severing the wing-tip segments from the mid-wing segments of the wings of bird carcasses as the carcasses are conveyed in a direction along a processing path and suspended from a conveyor line, the wings having a wing-tip bone having a first end, and a mid-wing bone having a proximal end adjacent the first end of the wing-tip bone and forming the wing-tip joint, and connecting tissue between the first and proximal ends, the apparatus comprising:
    support means for positioning the apparatus beneath the conveyor line;
    a pair of wing-tip cutting means mounted on said support means with each wing-tip cutting means positioned on opposite sides of the processing path for cutting through the wing-tip joints, wherein each wing-tip cutting means comprises a rotary disc cutter having a peripheral cutting edge; and
    guide means for directing the mid-wing and wing-tip of each wing in straddled relationship with each wing-tip cutting means and for directing the wing-tip joints into engagement with the cutting means for cutting with the cutting means through the connecting tissue between the first end of each wing-tip bone and the proximal end of each mid-wing bone.

8. The apparatus of claim 7 wherein the guide means comprises a pair of guide rods spaced outwardly from the processing path on opposite sides thereof for engaging the mid-wing sections of the wings so that the wing tip joints extend outwardly form the torso of the bird carcasses.

9. The apparatus of claim 7 wherein the guide means comprises a pair of guide rails spaced outwardly from the processing path on opposite sides thereof for engaging the wings and causing them to rotate rearwardly away from the direction of movement of the bird carcasses.

10. The apparatus of claim 7 wherein the guide means comprises a shoulder portion engagement ramp having an inclined surface and a surface substantially parallel to the processing path for engaging the shoulder portions of the carcasses and causing the carcasses to tilt rearwardly away from their direction of movement, the substantially parallel surface being positioned vertically in sufficient proximity of the conveyor line to cause the carcass suspended therefrom to tilt away from its direction of movement, thereby raising the joint between the wing and the carcass.

11. The apparatus of claim 7 wherein the wing tip cutting means comprises a pair of rotary disc cutters and a drive means for rotating the disc cutters and further comprising a pair of peripherally slotted guide discs, each mounted adjacent one of the rotary disc cutters and substantially coplaner therewith and drive means for rotating said slotted guide discs, said slotted guide discs adapted to receive the peripheral edge of said rotary disc cutters, whereby as the carcasses are conveyed along the processing path and the wings move past the rotary disc cutters, the wing tip joints are drawn into the intersection of the rotary disc cutters and adjacent slotted guide discs, wherein the wing tip segments are severed from the mid-wing segments.

12. The apparatus of claim 11 and further comprising a rotary brush disc mounted adjacent each of said slotted guide discs for engaging the wing tip segments and brushing them toward the rotary disc cutters.

13. A method of severing the wing-tip segments from the mid-wing segments of the wings of poultry carcasses as the carcasses are conveyed in a direction along a processing path and suspended from a conveyor line, comprising the steps of:

moving the bird carcasses in spaced series suspended invertedly by their legs from shackles along a conveyor path of a processing line toward a pair of rotary disc cutters that straddle the path of movement of the carcasses, as the carcasses are moved along the conveyor line, performing the following steps:

guiding the wing-tip joints into engagement with the rotary disc cutters, cutting with the disc cutters through the connecting tissue between the wing-tip segments and the mid-wing segments to sever the wing-tip segments from the mid-wing segments, and maintaining the wing-tip segments in a folded orientation with respect to their mid-wing segments about the disc cutters as the cutting steps are performed.

14. The method of claim 13 wherein the step of guiding the wing-tip joints comprises tilting the bird carcasses rearwardly away from their direction of movement in order to raise the joint between the wings and the carcass.

15. The method of claim 13 wherein the step of guiding the wing tip joints comprises engaging the mid-wing segments of the bird carcasses with a pair of guide rods that extend outwardly a portion of their length from the processing path, whereby the wing tip joints are extended outwardly away from the torso of the bird carcasses as the wing tips approach the cutting discs so that the mid-wing segments and wing tip segments straddle the cutting discs.

16. The method of claim 13 wherein the step of guiding the wing tip joints comprises engaging the drumettes and mid-wing segments of the wings with guide rod means causing the wings to pivot rearwardly.

17. The apparatus of claim 7, wherein the wing-tip cutting means comprises a peripherally slotted rotary guide disc having its peripheral slot receiving the peripheral cutting edge of said rotary disc cutter so that the cutting edge of said rotary disc cutter intercepts the periphery of said slotted guide discs.

18. An apparatus for severing the wing-tip segments from the mid-wing segments of the wings of bird carcasses as the carcasses are conveyed in a direction along a processing path and suspended from a conveyor line, the wings having a wing-tip bone having a first end, a mid-wing bone having a proximal end, and connecting tissue between the first and proximal ends and forming a wing-tip joint, the apparatus comprising:

support means for positioning the apparatus beneath the conveyor line;

wing-tip cutting means on said support means for cutting through the wing-tip joints; and guide means for directing the wing-tip joints into engagement with the cutting means for cutting through the connecting tissue between the first end of each wing-tip bone and the proximal end of each mid-wing bone; and said wing-tip cutting means comprising a pair of rotary disc cutters and drive means for rotating the disc cutters and further comprising a pair of peripherally slotted guide discs, each of said slotted guide discs mounted adjacent one of said rotary disc cutters and substantially co-planar therewith, and drive means for rotating said slotted guide discs, the peripheral slots of said slotted guide discs adapted to receive the peripheral edge of said rotary disc cutters;

whereby as the carcasses are conveyed along the processing path and the wings move past the rotary disc cutters, the wing-tip joints are drawn into the intersection of the rotary disc cutters and adjacent slotted guide discs and the wing-tip segments are severed from the mid-wing segments.

19. The apparatus of claim 18 and further comprising a rotary brush disc mounted adjacent each of said slotted guide discs for engaging the wing-tip segments and brushing them toward the rotary disc cutters.

* * * * *